US011823092B2

(12) United States Patent
Fairchild et al.

(10) Patent No.: US 11,823,092 B2
(45) Date of Patent: *Nov. 21, 2023

(54) COORDINATION PLATFORM FOR GENERATING AND MANAGING AUTHORITY TOKENS

(71) Applicant: Bank of America Corporation, Charlotte, NC (US)

(72) Inventors: Albena N. Fairchild, Spruce Pine, NC (US); Elena Kvochko, New York, NY (US); Crystal M. Sundaramoorthy, Charlotte, NC (US); Dipika Jain, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,582

(22) Filed: Aug. 30, 2022

(65) Prior Publication Data

US 2023/0005089 A1 Jan. 5, 2023

Related U.S. Application Data

(63) Continuation of application No. 16/902,432, filed on Jun. 16, 2020, now Pat. No. 11,468,525.

(51) Int. Cl.
*G06F 21/32* (2013.01)
*G06Q 50/18* (2012.01)
*G06F 21/33* (2013.01)

(52) U.S. Cl.
CPC ............ *G06Q 50/18* (2013.01); *G06F 21/32* (2013.01); *G06F 21/335* (2013.01)

(58) Field of Classification Search
CPC ........ G06F 21/32; G06F 21/335; G06F 21/52; H01L 21/288; H01L 21/76871;
(Continued)

(56) References Cited

U.S. PATENT DOCUMENTS 5,995,624 A 11/1999 Fielder et al.
6,195,698 B1 2/2001 Lillibridge et al.
(Continued)

OTHER PUBLICATIONS

Jul. 26, 2022 U.S. Notice of Allowance U.S. Appl. No. 16/902,432.

*Primary Examiner* — Samson B Lemma
(74) *Attorney, Agent, or Firm* — Banner & Witcoff, Ltd.

(57) ABSTRACT

Aspects of the disclosure relate to using secure authentication tokens to grant power of attorney. A computing platform may receive user input indicating a task and requesting that a power of attorney be granted to an individual. The computing platform may generate an authority token granting the individual the power of attorney to perform the task, and may send the authority token, along with task information indicating the task, to the individual. The computing platform may receive a validation request including the authority token and the task information. Based on successful validation, the computing platform may send validation information to an event processing system. After receiving confirmation that the task has been performed by the individual, the computing platform may update dashboard information to indicate that the task has been completed, which may cause the user device to display a dashboard indicating completion of the task.

19 Claims, 16 Drawing Sheets

(58) Field of Classification Search
CPC ......... H01L 21/76877; H01L 21/76898; H01L 21/76843; H01L 21/76846; H01L 21/76874; G06Q 30/18
USPC .......................................... 713/168; 705/311
See application file for complete search history.

(56) References Cited

U.S. PATENT DOCUMENTS

| | | |
|---|---|---|
| 7,574,596 B2 | 8/2009 | Chen et al. |
| 7,739,733 B2 | 6/2010 | Szydlo |
| 7,865,943 B2 | 1/2011 | Hayler et al. |
| 8,438,383 B2 | 5/2013 | Gamez et al. |
| 9,223,950 B2 | 12/2015 | Li et al. |
| 9,461,821 B1 | 10/2016 | Machani et al. |
| 9,608,990 B2 | 3/2017 | Kobayashi |
| RE46,439 E | 6/2017 | Schneider et al. |
| 9,794,228 B2 | 10/2017 | Li et al. |
| 9,967,253 B2 | 5/2018 | Tamura |
| 9,992,171 B2 | 6/2018 | Ramachandra Rao et al. |
| 9,992,206 B2 | 6/2018 | Geller |
| 10,042,993 B2 | 8/2018 | Beigi |
| 10,291,609 B2 | 5/2019 | Gullicksen |
| 10,375,069 B2 | 8/2019 | Matsugashita |
| 10,412,075 B2 | 9/2019 | Matsugashita |
| 10,574,645 B2 | 2/2020 | Tamura |
| 10,706,416 B2 * | 7/2020 | Heyner ................. H04L 9/3234 |
| 2008/0120129 A1 * | 5/2008 | Seubert ................ G06Q 40/125 705/305 |
| 2008/0222041 A1 * | 9/2008 | Mani ..................... G06Q 10/10 705/51 |
| 2008/0294639 A1 * | 11/2008 | Davis .................... G06Q 10/10 707/999.009 |
| 2015/0228039 A1 | 8/2015 | Mahgoub et al. |
| 2018/0196950 A1 * | 7/2018 | Heyner .................. G06F 21/64 |
| 2020/0167453 A1 * | 5/2020 | Bouse .................... G06F 21/31 |
| 2020/0204370 A1 * | 6/2020 | Wisniewski .......... H04L 9/3231 |
| 2021/0326305 A1 * | 10/2021 | Madisetti ............. G06F 16/176 |
| 2021/0326426 A1 * | 10/2021 | Bouse .................... G06F 21/31 |
| 2021/0392131 A1 * | 12/2021 | Svede .................. H04L 63/083 |
| 2022/0014372 A1 * | 1/2022 | Wisniewski .......... H04L 9/3231 |

* cited by examiner

405

Client Dashboard Interface

| Task | Individual & Task Status |
|---|---|
| Close Safety Deposit Box | Individual TBD – Incomplete |
| Turn Off Power | Individual #3 – Incomplete |

Task Interface

You previously consented to being a power of attorney recipient for Individual #1. Individual #1 has requested that you be granted power of attorney to close out a safety deposit box in his name. Are you willing to complete this task?

Yes            No

Client Dashboard Interface

Your task was unable to be completed as requested. Please select one of the options below:

1) Grant Alternate Power of Attorney & Void Existing Power of Attorney

2) Maintain Existing Power of Attorney

3) Void Existing Power of Attorney

Biometric Prompt

Please place your finger on the scanner below to input biometric information.

(scanner)

FIG. 7

COORDINATION PLATFORM FOR GENERATING AND MANAGING AUTHORITY TOKENS

CROSS REFERENCE TO RELATED APPLICATIONS

This application is a continuation of and claims priority to co-pending U.S. application Ser. No. 16/902,432, filed Jun. 16, 2020, and entitled "Coordination Platform For Generating and Managing Authority Tokens," which is incorporated herein by reference in its entirety.

BACKGROUND

Aspects of the disclosure relate to data processing systems, information security, and electronic event processing. In particular, one or more aspects of the disclosure relate to computing platforms that implement token generation and validation methods in coordinating, delegating, and granting authority, as well as verifying such grants of authority.

In some cases, an individual may be indisposed or otherwise unavailable to perform a task that requires in person performance by the individual or another individual granted power of attorney, and may grant the power of attorney to the other individual accordingly. In some instances, however, such grant of power of attorney may raise various security concerns, including information security concerns, because the grant of power of attorney may be misused to perform tasks beyond the scope of the granted authority and/or used by a bad actor impersonating the true recipient of the power of attorney. Accordingly, these security concerns may limit willingness to grant power of attorney from a remote or otherwise different location than a law office, an enterprise organization at which the task may be performed (e.g., a financial institution, utility company, or the like), or the like. This sparse grant of power of attorney may result in technical inefficiencies such as an inability to perform tasks, process and/or execute various events, or the like until an individual is able to physically return to the enterprise organization. Furthermore, these security concerns may limit transfer of power of attorney in an electronic manner.

SUMMARY

Aspects of the disclosure provide effective, efficient, scalable, and convenient technical solutions that address and overcome the technical problems associated with granting and validating authority tokens, such as power of attorney tokens. For example, some aspects of the disclosure provide techniques that may enable computing devices to identify a power of attorney recipient, generate an authority token granting a limited power of attorney to that recipient, and subsequently validate the authority token. In some instances, this authority token may be encrypted and/or may be validated using biometric data. In doing so, various technical advantages may be realized. For example, one technical advantage is increased security of electronic transfer of power of attorney (e.g., by encrypting the token for decryption exclusively by an event processing system configured to perform a specific task corresponding to the power of attorney). Another technical advantage is improved power of attorney validation by implementing multi-layer validation that includes validating the authority token (e.g., based on successful decryption), validating task information (e.g., ensuring that tasks performed are limited to those for which power of attorney has been granted), and/or validating identity (e.g., using biometrics to verify that the individual attempting to perform the task is the true recipient of the authority token). Accordingly, these advantages may result in increased enterprise efficiencies (e.g., task performance, event processing, or the like) and/or increased security of electronic power of attorney grants and utilization.

In accordance with one or more embodiments of the disclosure, a computing platform comprising at least one processor, a communication interface, and memory storing computer-readable instructions may receive, from a user device corresponding to a first individual, contact information for a second individual. The computing platform may store the contact information in a user profile corresponding to the second individual. The computing platform may receive user input indicating a task to be performed and requesting that a power of attorney be granted to the second individual, where the task is required to be performed in person by one of: the first individual or an individual who has been granted power of attorney by the first individual. The computing platform may generate an authority token granting the second individual the power of attorney for the first individual to perform the task. Using the contact information, the computing platform may send the authority token and task information indicating the task to a user device corresponding to the second individual. After sending the authority token and the task information indicating the task to the user device corresponding to the second individual, the computing platform may receive, from an event processing system, a validation request comprising the authority token and the task information indicating the task. The computing platform may validate the authority token and the task information indicating the task. Based on successful validation of the authority token and the task information indicating the task, the computing platform may send authority validation information to the event processing system. The computing platform may receive confirmation information from the user device corresponding to the second individual indicating that the task has been completed. After receiving confirmation that the task has been performed by the second individual, the computing platform may update client dashboard information to indicate that the task has been completed, which may cause the user device to display a client dashboard indicating that the task has been completed.

In one or more instances, the first individual may be located in a first state, and the task may be limited to performance in a second state. In one or more instances, the task may be performed at a first enterprise organization, and the authority token may be formatted for use exclusively by the first enterprise organization.

In one or more instances, the computing platform may generate the authority token by: 1) sending, to the user device corresponding to the second individual, a request to input biometric data, 2) receiving biometric information corresponding to the second individual, and 3) generating, based at least in part on the biometric information, the authority token.

In one or more instances, the computing platform may send, to the user device corresponding to the second individual, a request to display an indication of the task and prompt for acceptance of the task. The computing platform may receive, from the user device corresponding to the second individual, task acceptance information indicating that the second individual will perform the task. In these instances, the computing platform may generate the authority token based on receipt of the task acceptance information.

In one or more instances, the request to input the biometric data may be sent along with the request to display the indication of the task and the biometric data may be received along with the task acceptance information. In one or more instances, the request to input the biometric data may be sent along with the authority token.

In one or more instances, the computing platform may receive additional biometric data from the user device corresponding to the second individual. By comparing the additional biometric data to the biometric data, the computing platform may identify a biometric match for the second individual. Based on identifying the biometric match for the second individual, the computing platform may send biometric validation information to the event processing system.

In one or more instances, sending the authority validation information and the biometric validation information to the event processing system may cause the event processing system to perform one or more actions corresponding to the task. In one or more instances, the client dashboard may include a status of one or more tasks including the task, where each of the one or more tasks are performed by one or more individuals including the second individual.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-8 depict illustrative graphical user interfaces for implementing techniques for generation and validation of a power of attorney token in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a secure vault that provides a centralized place where authority tokens may be stored. The authority tokens may, for instances, may provide consent by a first individual to one or more other individuals to handle actions on the first individual's behalf. The secure vault may operate as a certificate authority and may provide an individual with a single place to create, manage, and/or revoke authority delegations. For example, if an individual is using DNA identification or other multi-factor authentication to conduct business, but is indisposed, he or she may be able to delegate authority to a family member (e.g., to give power of attorney) to handle matters on the disposed individuals behalf. Aspects of the disclosure may be applied in use cases involving finance, natural disasters, emergences, life events, and/or other instances.

Accordingly, by performing one or more of the methods described herein, power of attorney may be granted in a remote and secure manner and may be verified using multi-factor authentication. This may allow for indisposed or otherwise unavailable individuals to perform tasks that may require in person performance (e.g., by the individuals or one granted a power of attorney) while minimizing security risks. For example, a secure token may be created in the secure vault and rights associated with the token may be granted from one user to another as a representation of the power of attorney. This secure token may be validated along with an indication of the task to be performed (e.g., a holder of the token is limited to perform a particular task), biometric information (e.g., to further verify the identity of the holder of the power of attorney), or the like. Furthermore, in some instances, the time limited nature of the secure token may contribute to increased security.

Figure 1A:
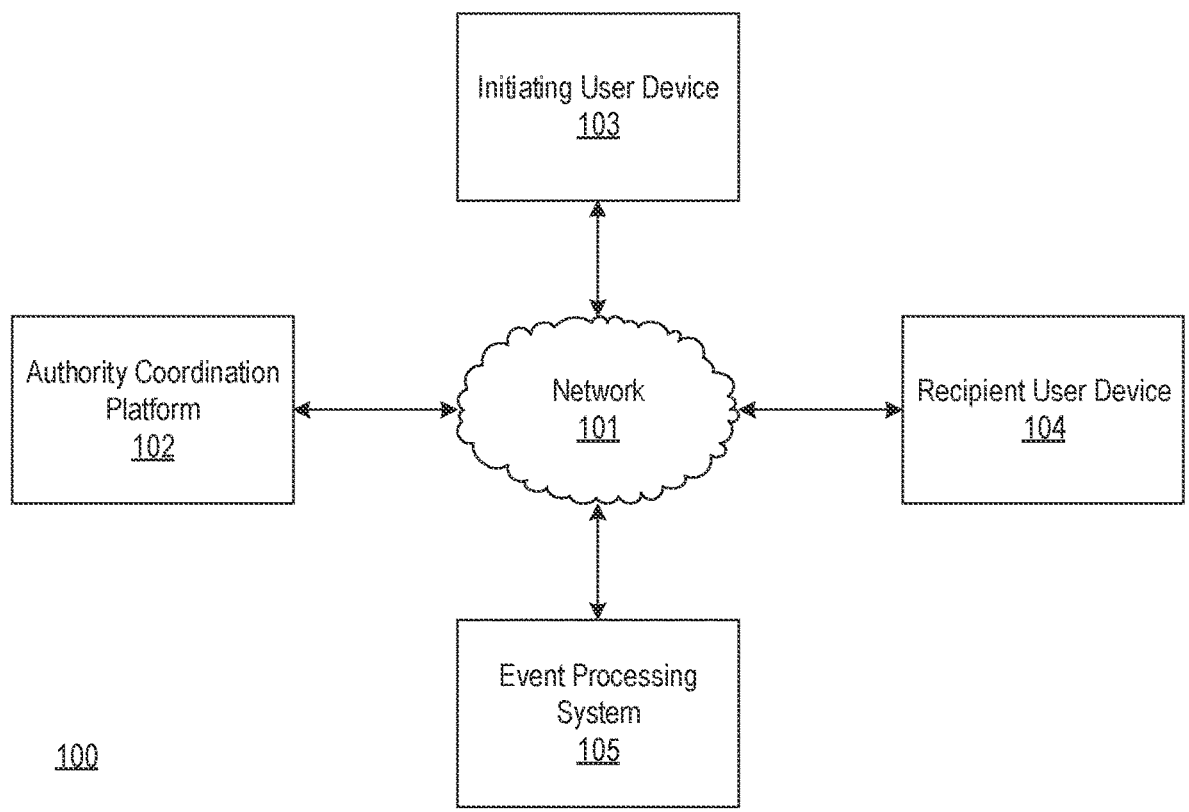
FIGS. 1A-1B depict an illustrative computing environment for implementing techniques for generation and validation of a power of attorney token in accordance with one or more example embodiments.
Figure 1B:
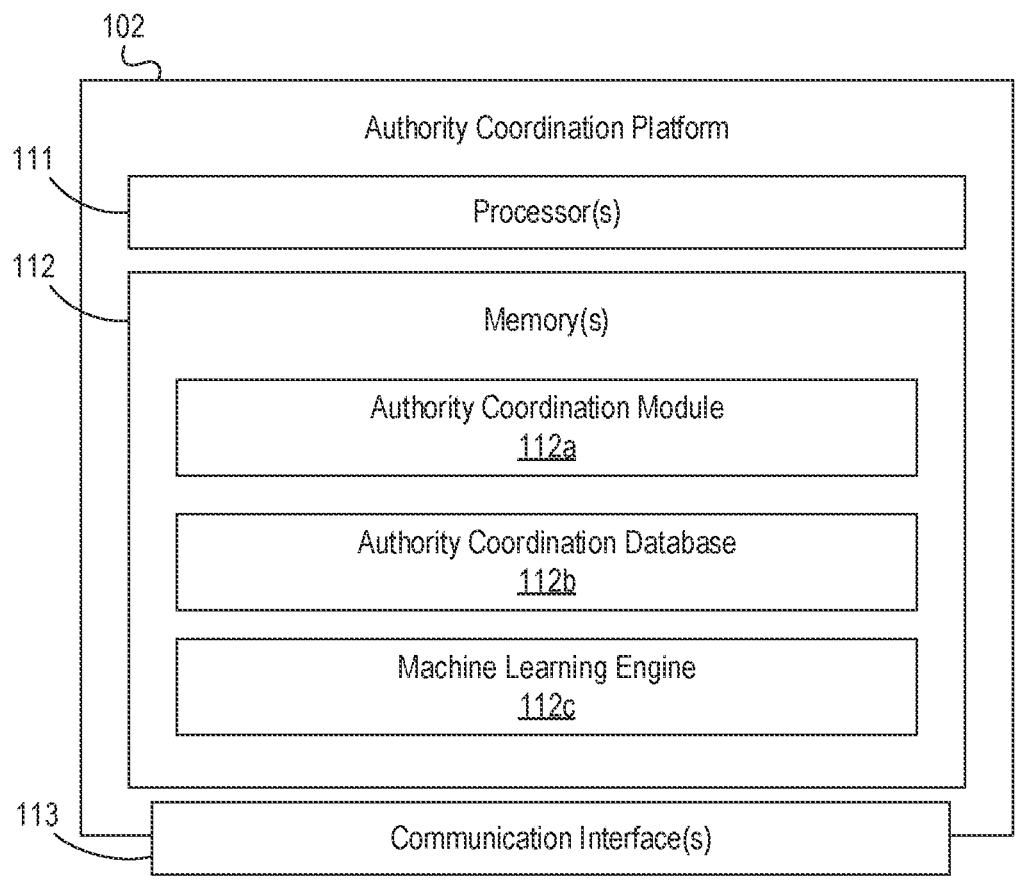

FIGS. 1A-1B depict an illustrative computing environment that implements generation and validation of a power of attorney token in accordance with one or more example embodiments. Referring to FIG. 1A, computing environment 100 may include one or more computer systems. For example, computing environment 100 may include an authority coordination platform 102, an initiating user device 103, recipient user device 104, and event processing system 105.

As described further below, authority coordination platform 102 may be a computer system that includes one or more computing devices (e.g., servers, server blades, or the like) and/or other computer components (e.g., processors, memories, communication interfaces) that may be used to generate, manage, and otherwise validate power of attorney (POA) tokens. In some instances, the authority coordination platform 102 may be configured to maintain a database of user profiles that may include contact information for one or more POA recipients. In some instances, the authority coordination platform 102 may host client dashboard interface information indicative of one or more tasks for which POA tokens are active or otherwise scheduled for generation, an individual responsible for the tasks, a task status, or the like.

Initiating user device 103 may be a mobile device, tablet, smartphone, desktop computer, laptop computer, or the like, that may be used by an individual to request POA token generation. For example, the initiating user device 103 may be operated by an individual who is indisposed or otherwise unable to complete a task that requires in person performance by the individual or another individual who has been granted power of attorney. In some instances, the initiating user device 103 may be configured to display a client dashboard interface that includes one or more tasks, task owners (e.g., individuals granted POA to perform the tasks), task statuses, or the like.

Recipient user device 104 may be a mobile device, tablet, smartphone, desktop computer, laptop computer, enhanced reality device (e.g., headset, glasses, or the like), or the like, that may be used by an individual who has been granted POA to perform a task for the user of the initiating user device 103. In some instances, the recipient user device 104 may be configured to receive and store a POA token. In some instances, the recipient user device 104 may be configured with a camera and/or one or more biometric sensors that may be used to collect biometric data corresponding to the user of the recipient user device 104.

Event processing system 105 may be a server, server blade, or the like configured to perform one or more enterprise activities (e.g., financial transactions, utility management, or the like) that may require use of a POA. In some instances, event processing system 105 may be configured to perform a task for which a user of the recipient user device 104 has been granted POA by the user of the initiating user device 103.

Computing environment 100 also may include one or more networks, which may interconnect authority coordination platform 102, initiating user device 103, recipient user device 104, event processing system 105, or the like. For example, computing environment 100 may include a network 101 (which may interconnect, e.g., authority coordination platform 102, initiating user device 103, recipient user device 104, event processing system 105, or the like).

In one or more arrangements, authority coordination platform 102, initiating user device 103, recipient user device 104, and/or event processing system 105 may be any type of computing device capable of sending and/or receiving requests and processing the requests accordingly. For example, authority coordination platform 102, initiating user device 103, recipient user device 104, event processing system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of authority coordination platform 102, initiating user device 103, recipient user device 104, and/or event processing system 105 may, in some instances, be special-purpose computing devices configured to perform specific functions.

Referring to FIG. 1B, authority coordination platform 102 may include one or more processors 111, memory 112, and communication interface 113. A data bus may interconnect processor 111, memory 112, and communication interface 113. Communication interface 113 may be a network interface configured to support communication between authority coordination platform 102 and one or more networks (e.g., network 101, or the like). Memory 112 may include one or more program modules having instructions that when executed by processor 111 cause authority coordination platform 102 to perform one or more functions described herein and/or one or more databases that may store and/or otherwise maintain information which may be used by such program modules and/or processor 111. In some instances, the one or more program modules and/or databases may be stored by and/or maintained in different memory units of authority coordination platform 102 and/or by different computing devices that may form and/or otherwise make up authority coordination platform 102. For example, memory 112 may have, host, store, and/or include authority coordination module 112a, authority coordination database 112b, and a machine learning engine 112c.

Authority coordination module 112a may have instructions that direct and/or cause authority coordination platform 102 to execute advanced generation, encryption, and validation techniques related to POA tokens, as discussed in greater detail below. Authority coordination database 112b may store information used by authority coordination module 112a and/or authority coordination platform 102 in application of advanced generation, encryption, and validation techniques related to POA tokens, and/or in performing other functions. Machine learning engine 112c may have instructions that direct and/or cause the authority coordination platform 102 to set, define, and/or iteratively refine optimization rules and/or other parameters used by the authority coordination platform 102 and/or other systems in computing environment 100.

Figure 2A:
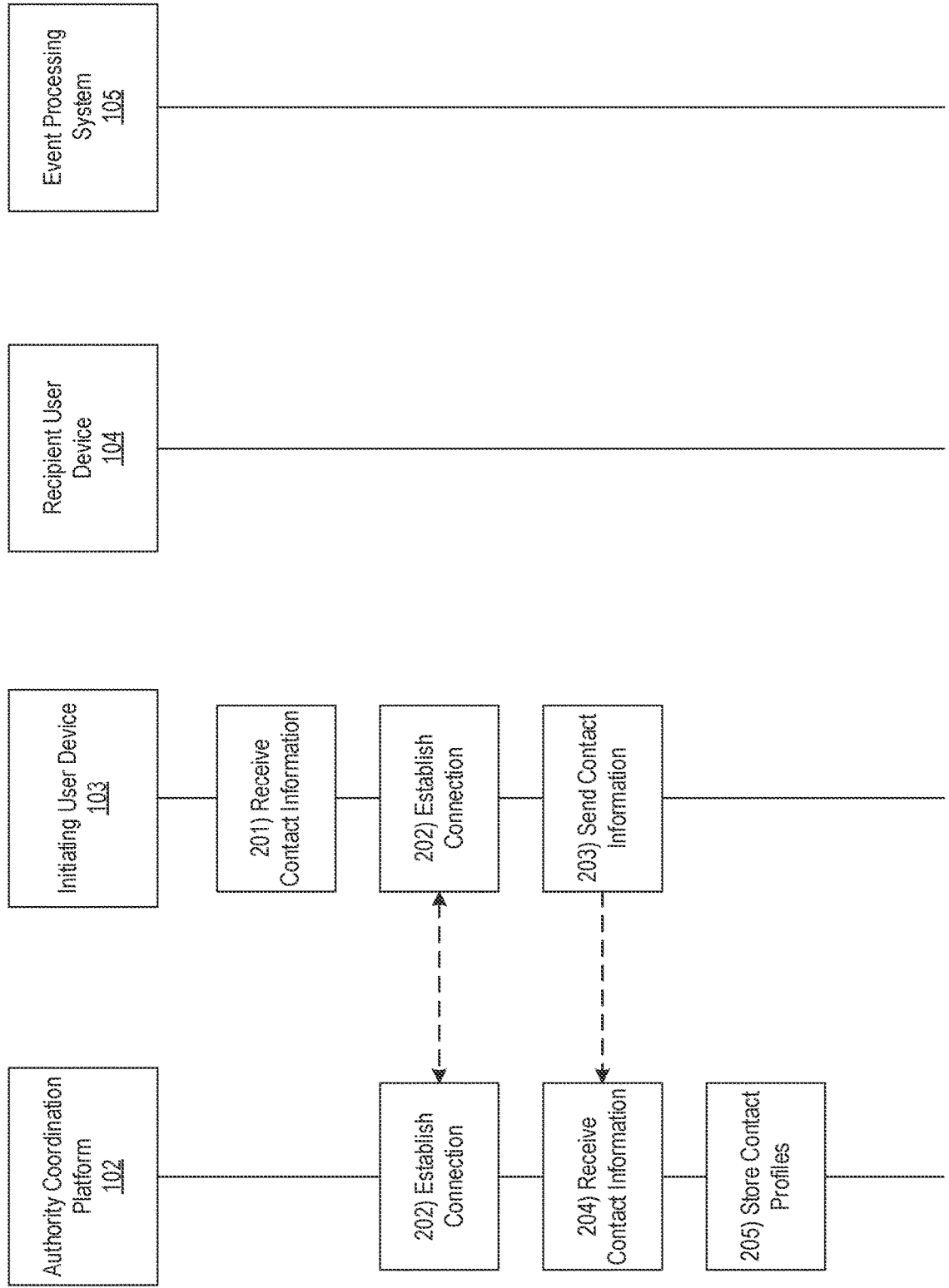
FIGS. 2A-2J depict an illustrative event sequence for implementing techniques for generation and validation of a power of attorney token in accordance with one or more example embodiments.

FIGS. 2A-2J depict an illustrative event sequence that implements generation and validation of a power of attorney token in accordance with one or more example embodiments. Referring to FIG. 2A, at step 201, the initiating user device 103 may receive contact information. For example, the initiating user device 103 may receive information for one or more individuals who may be granted POA by a user of the initiating user device 103. In some instances, in receiving the contact information, the initiating user device 103 may receive phone numbers, email addresses, physical addresses, social media account information, or the like. In some instances, the initiating user device 103 may receive contact information prior to receiving a request to grant POA to a particular individual. For example, the initiating user device 103 may compile a list of one or more individuals who may be granted POA at a future time. In doing so, the initiating user device 103 may expedite the process of granting the POA once requested.

At step 202, the initiating user device 103 may establish a connection with the authority coordination platform 102. For example, the initiating user device 103 may establish a first wireless data connection with the authority coordination platform 102 to link the initiating user device 103 to the authority coordination platform 102 (e.g., in preparation for sending the contact information). In some instances, the initiating user device 103 may determine whether or not a connection is already established with the authority coordination platform 102. If a connection is already established with the authority coordination platform 102, the initiating user device 103 might not re-establish the connection. If a connection is not already established with the authority coordination platform 102, the initiating user device 103 may establish the first wireless data connection as described herein.

At step 203, the initiating user device 103 may send the contact information received at step 201. In some instances, the initiating user device 103 may send the contact information to the authority coordination platform 102 while the first wireless data connection is established.

At step 204, the authority coordination platform 102 may receive the contact information sent at step 203. In some instances, the authority coordination platform 102 may receive the contact information via the communication interface 113 and while the first wireless data connection is established.

At step 205, the authority coordination platform 102 may store one or more contact profiles based on the contact information received at step 204. For example, the authority coordination platform 102 may store information for an initiating user account (e.g., corresponding to the user of initiating user device 103 who may want to grant POA to other individuals). For each initiating user account, the authority coordination platform 102 may store one or more contact profiles (e.g., corresponding to the other individuals who may be granted POA by the user of the initiating user device 103). In storing the one or more contact profiles, the authority coordination platform 102 may store phone numbers, email addresses, social media account information, physical addresses, or the like corresponding to these other individuals who may be granted POA in the future. In doing so, the authority coordination platform 102 may store individual identities and their contact information in advance of a POA request from the initiating user device 103, and may expedite the process of notifying these individuals of the POA request and/or granting the POA accordingly. In some instances, the individuals may provide consent or otherwise authorize the authority coordination platform 102 to include them in the contact profiles.

Figure 2B:
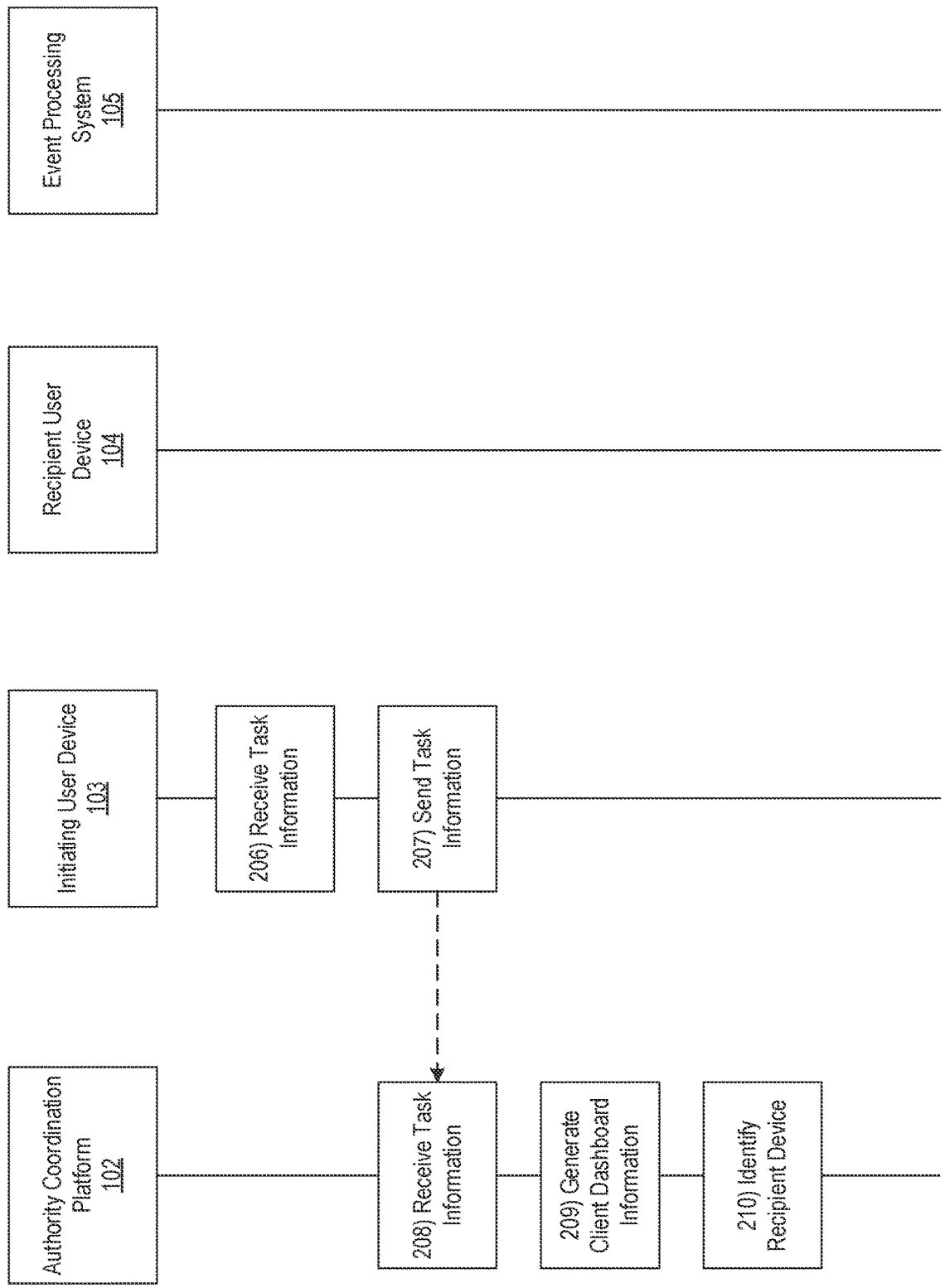

Referring to FIG. 2B, at step 206, the initiating user device 103 may receive task information. For example, the initiating user device 103 may receive a user input indicating a task to be performed. In some instances, the initiating user device 103 may receive user input indicating a task to be performed where the task must be performed in person by the user of the initiating user device 103 (e.g., a first individual) or another individual who has been granted power of attorney by the first individual (e.g., a second individual). In these instances, the first individual may be located in a first state, and the second individual may be located in a second state. Additionally or alternatively, the first individual may be unable to perform the task (e.g., he or she may be indisposed, incarcerated, or otherwise unavailable), and the second individual may be able to perform the task. For example, the initiating user device 103 may receive task information requesting that POA be granted to perform a task such as: operation of a safety deposit box (e.g., accessing and/or conducting transactions involving such a box, opening and/or closing such a box, or the like), operation of utilities (e.g., turning on and/or turning off electricity, water, heat, cable, and/or other utility services), authorizing and/or making financial decisions, and/or conducting other tasks. In some instances, along with the task information, the initiating user device 103 may receive a request to grant POA to perform that task (e.g., a specific POA directed to the indicated task). Additionally or alternatively, the initiating user device 103 may receive a request to grant a durable POA, general POA, or the like. In some instances, the initiating user device 103 may receive user input indicating an individual (e.g., the second individual) to whom POA should be granted (who may e.g., be specified in the user profiles stored at step 205). In other instances, the initiating user device 103 might not receive user input indicating a specific individual to whom POA should be granted.

At step 207, the initiating user device 103 may send the task information, received at step 206, to the authority coordination platform 102. In some instances, the initiating user device 103 may send the task information while the first wireless data connection is established. In some instances, the initiating user device 103 may send, along with or included in the task information, an indication of an individual to whom POA should be granted and/or a request to grant the POA.

At step 208, the authority coordination platform 102 may receive the task information sent at step 207. In some instances, the authority coordination platform 102 may receive the task information via the communication interface 113 and while the first wireless data connection is established.

At step 209, the authority coordination platform 102 may generate client dashboard information using the task information. For example, the authority coordination platform 102 may generate information that may be used (e.g., by the initiating user device 103) to generate a dashboard or task list similar to graphical user interface 405, which is shown in FIG. 4. For example, the authority coordination platform 102 may generate information corresponding to tasks to be performed, individuals granted POA to perform the tasks, a status of the tasks, or the like. In the example illustrated in FIG. 4, it is assumed that the task information received at step 208 requested that a safety deposit box be closed, and that a request to grant POA to turn off power was previously received and is in progress by "Individual #3." For example, as illustrated in FIG. 4, the authority coordination platform 102 may manage multiple tasks simultaneously for the first individual user, which may each be performed by different POA recipients.

At step 210, the authority coordination platform 102 may identify a recipient device using the contact profiles stored at step 205. For example, the authority coordination platform 102 may have received an identity (e.g., a name, or the like) for an individual to be granted POA to perform the task. In this example, the authority coordination platform 102 may index the name within the contact profiles to identify contact information for the individual (e.g., the second individual) such as a phone number of the recipient user device 104.

In some instances, the authority coordination platform 102 might not receive an identity for an individual to be granted POA, and may instead apply one or more machine learning algorithms and/or datasets to identify the second individual. For example, in some instances, the authority coordination platform 102 may maintain historical data regarding tasks performed by the second individual, an acceptance rate for the second individual (e.g., how often does the second individual accept tasks), whether or not the second individual was successful in performing these tasks, or the like. In these instances, the authority coordination platform 102 may select an individual (e.g., the second individual) who is most likely to succeed at performing the task. In some instances, the authority coordination platform 102 may generate a POA score for each additional individual that has a contact profile (e.g., based on the historical data) and may use the POA score to select the second individual. For example, the authority coordination platform 102 may generate a ranked list of individuals based on the POA scores, and may select the individual with the highest score.

In some instances, the authority coordination platform 102 may receive an identity for an individual to be granted POA, but may use a machine learning process as described above to identify a different and/or recommended individual to be granted POA. In these instances, the authority coordination platform 102 may send a message, notification, or the like to the initiating user device 103 recommending the recommended individual, and prompting a user of the initiating user device 103 (e.g., the first user) to select between the initial individual and the recommended individual.

Figure 2C:
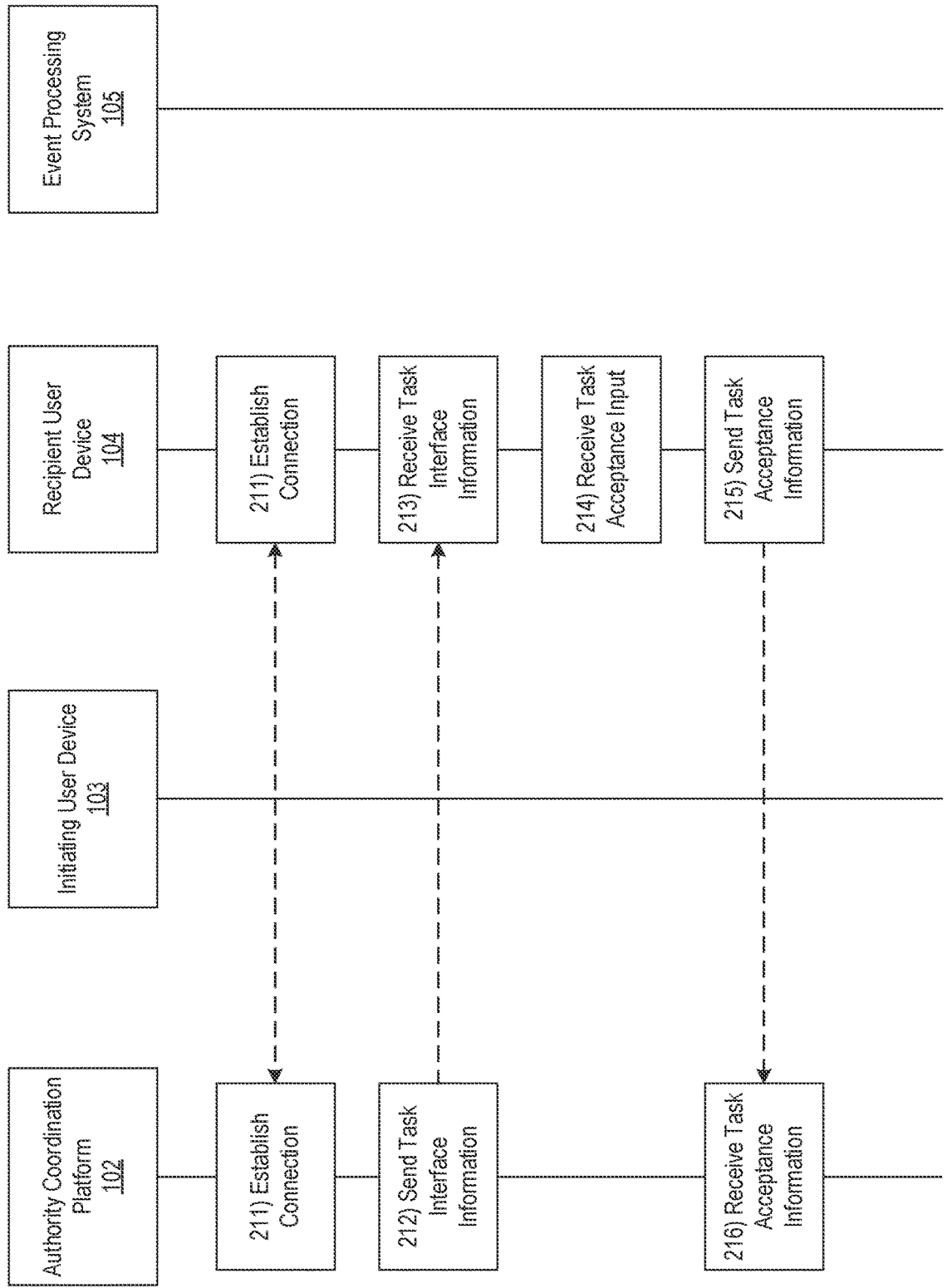

Referring to FIG. 2C, at step 211, the authority coordination platform 102 may establish a connection with recipient user device 104. For example, the authority coordination platform 102 may establish a second wireless data connection with the recipient user device 104 to link the authority coordination platform 102 to the recipient user device 104 (e.g., in preparation for sending the task information). In some instances, the authority coordination platform 102 may identify whether or not a connection is already established with the recipient user device 104. If a connection is already established with the recipient user device 104, the authority coordination platform 102 might not re-establish the connection. If a connection is not yet established with the recipient user device 104, the authority coordination platform 102 may establish the second wireless data connection as described herein.

At step 212, the authority coordination platform 102 may send task interface information to the recipient user device 104. For example, the authority coordination platform 102 may send the task interface information to the recipient user device 104 via the communication interface and while the second wireless data connection is established. In some instances, along with the task interface information, the authority coordination platform 102 may send a request or one or more commands to prompt for a task acceptance input. In some instances, the authority coordination platform 102 may send, along with the task interface information, a request to input biometric data (e.g., a fingerprint, facial image data, retinal image data, or the like).

At step 213, the recipient user device 104 may receive the task interface information sent at step 212. In some instances, the recipient user device 104 may receive the task interface information while the second wireless data connection is established. In some instances, the recipient user device 104 may receive the request or one or more commands to prompt for the task acceptance input and/or the request to input biometric data.

At step 214, the recipient user device 104 may generate and display a task interface, and may receive a task acceptance input at the task interface. For example, the recipient user device 104 may use the task interface information received at step 213 to generate a graphical user interface similar to graphical user interface 505, which is shown in FIG. 5. For example, the recipient user device 104 may indicate the task and request whether or not the second individual is willing to complete the task. In some instances, the recipient user device 104 may receive a user input indicating that the second individual is willing to complete the task. In other instances, the recipient user device 104 may receive a user input indicating that the second individual is not willing to complete the task. In some instances, the recipient user device 104 may display the task interface based on the request or one or more commands to prompt for the task acceptance input. In some instances, the recipient user device 104 may also display a prompt for biometric data and may collect biometric data accordingly using the prompt.

At step 215, the recipient user device 104 may send task acceptance information (e.g., indicating whether or not the second individual accepted the task) to the authority coordination platform 102. In some instances, the recipient user device 104 may send the task acceptance information to the authority coordination platform 102 while the second wireless data connection is established. In some instances, the recipient user device 104 may send biometric data, collected at step 214, to the authority coordination platform 102 along with the task acceptance information.

At step 216, the authority coordination platform 102 may receive the task acceptance information sent at step 215. For example, the authority coordination platform 102 may receive the task acceptance information via the communication interface 113 and while the second wireless data connection is established. If the authority coordination platform 102 receives task acceptance information indicating that the second individual has accepted the task, the authority coordination platform 102 may proceed to step 217. If the authority coordination platform 102 receives task acceptance information indicating that the second individual has not accepted the task, the authority coordination platform 102 may return to step 210 to identify an alternative individual.

Figure 2D:
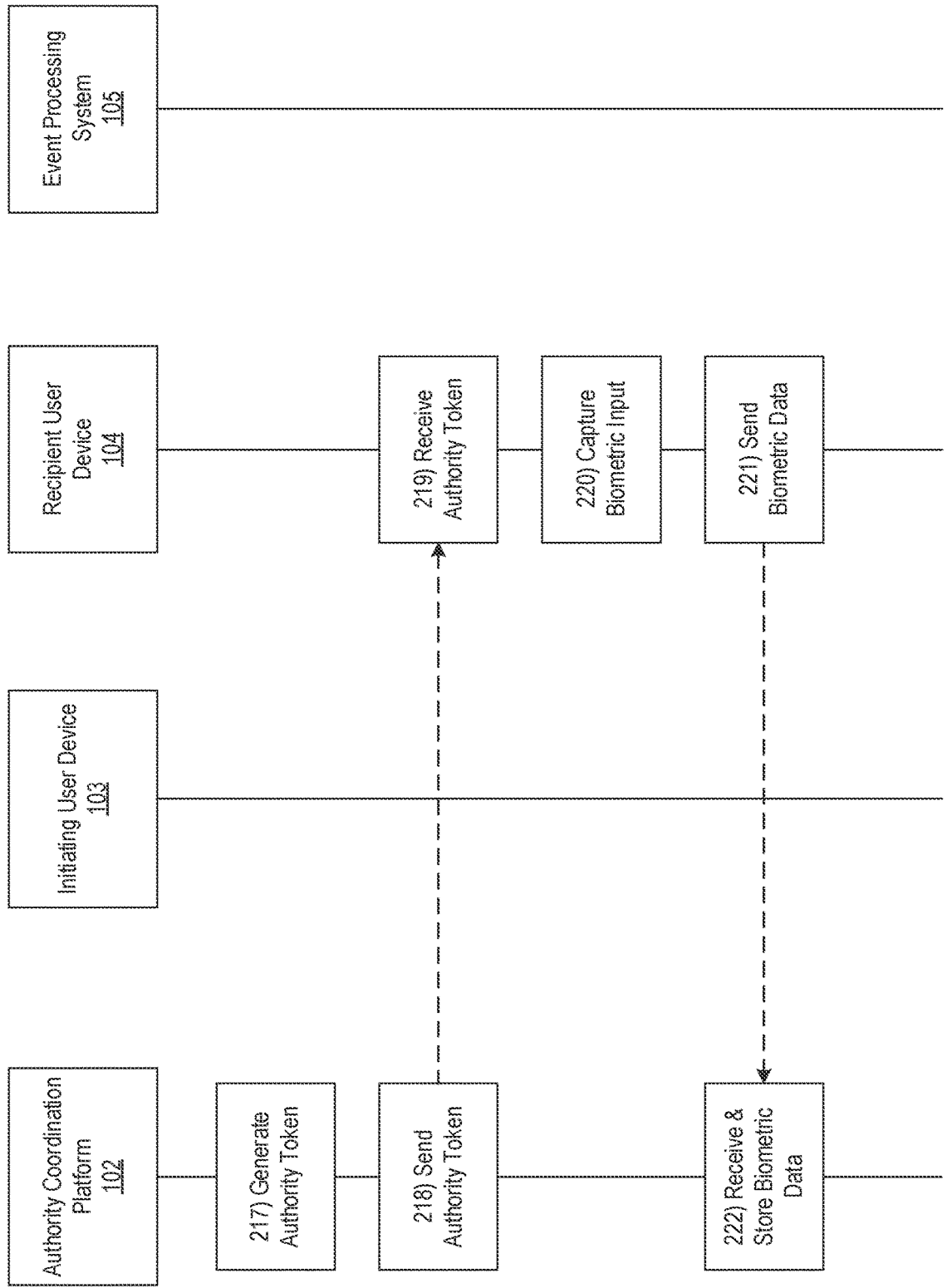

Referring to FIG. 2D, at step 217, the authority coordination platform 102 may generate an authority token granting POA to the second individual. In some instances, the authority coordination platform 102 may include biometric information. For example, in some instances, the recipient user device 104 may prompt the second individual to input biometric information (e.g., fingerprint, facial scan, retinal scan, photograph, or the like), and may send the biometric information to the authority coordination platform 102 along with the task acceptance information. In these instances, the authority coordination platform 102 may embed the biometric information into the authority token.

In some instances, the authority coordination platform 102 may encrypt the authority token using a symmetric key, public key, and/or public private key exchange with the event processing system 105 (e.g., the system configured to perform the task). In doing so, the authority coordination platform 102 may secure the authority token from access by an alternative system.

In some instances, the authority coordination platform 102 may format the authority token for use by the event processing system 105. For example, an event processing system maintained by a first enterprise organization may process authority tokens in a different format than an event processing system maintained by a second enterprise organization. Accordingly, the authority coordination platform 102 may format the authority token using parameters for the event processing system 105. This may further enhance security as other unintended systems may be unable to process the authority token even if it is decrypted.

In some instances, in generating the authority token, the authority coordination platform 102 may encode a time limitation into the authority token. In doing so, the authority coordination platform 102 may cause the authority token to expire if the task corresponding to the token is not performed within a predetermined period of time.

In some instances, in generating the authority token, the authority coordination platform 102 may generation token validation information that may be used to validate the authority token in the future. In these instances, the authority coordination platform 102 may store the token validation information.

In some instances, in generating the authority token, the authority coordination platform 102 may request a signature from the first individual granting the POA, and may cause the initiating user device 103 to display a written POA for signature. In these instances, the POA may be vetted in advance by an attorney licensed to practice in the state in which the POA is being signed, where the POA will be used (e.g., by the second individual), or the like.

At step 218, the authority coordination platform 102 may send the authority token, generated at step 217, to the recipient user device 104. In some instances, the authority coordination platform 102 may send the authority token to the recipient user device 104 via the communication interface 113 and while the second wireless data connection is established. In some instances, the authority coordination platform 102 may send, along with the authority token, one or more commands directing the recipient user device 104 to prompt for biometric data.

At step 219, the recipient user device 104 may receive the authority token sent at step 218. In some instances, the recipient user device 104 may receive the authority token while the second wireless data connection is established. In some instances, the recipient user device 104 may receive the one or more commands directing the recipient user device 104 to prompt for biometric data. In some instances, in receiving the authority token, the recipient user device 104 may receive a time limited token that may expire if the task is not performed within a predetermined period of time (e.g., a day, a week, a month, or the like). For example, the second individual might not be granted power of attorney indefinitely.

At step 220, the recipient user device 104 may capture a biometric input. In some instances, if the recipient user device 104 previously captured biometric information (e.g., at step 214), the recipient user device 104 might not re-capture the biometric information. If the recipient user device 104 did not previously capture biometric information however, the recipient user device 104 may generate a graphical user interface similar to graphical user interface 705, which is illustrated in FIG. 7. For example, the recipient user device 104 may capture fingerprint data, retinal data, image data, or the like that may be used to verify an identity of the second individual.

At step 221, the recipient user device 104 may send biometric data (e.g., based on the input received at step 220) to the authority coordination platform 102. For example, the recipient user device 104 may send the biometric data to the authority coordination platform 102 while the second wireless data connection is established.

At step 222, the authority coordination platform 102 may receive and store the biometric data sent at step 221. In some instances, the authority coordination platform 102 may receive the biometric data via the communication interface and while the second wireless data connection is established. In some instances, the authority coordination platform 102 may store the biometric data along with the token validation information (e.g., in preparation for validating an identity of the second individual in the future).

Figure 2E:
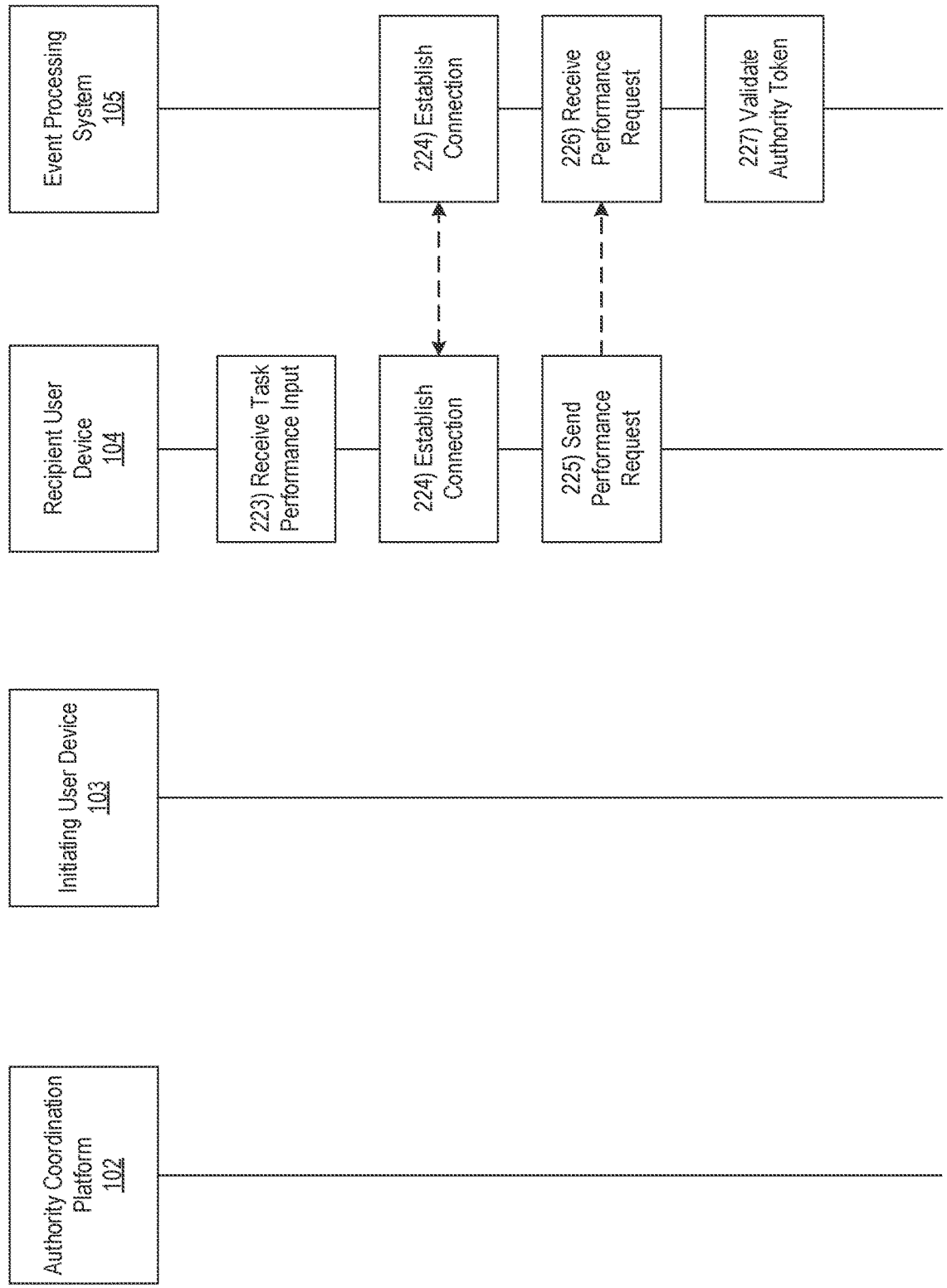

Referring to FIG. 2E, at step 223, the recipient user device 104 may receive a task performance input. For example, the recipient user device 104 may receive a user input attempting to perform the task. In continuing with the illustrative example described above, the recipient user device 104 may receive a user input attempting to close a safety deposit box. In some instances, the second individual may be located at a physical location of the safety deposit box and/or interacting with an employee of an enterprise organization that is managing the safety deposit box when the recipient user device 104 receives the task performance input. For example, the recipient user device 104 may receive a user input that causes the recipient user device 104 to generate a matrix barcode, such as a quick response (QR) code, that may be scanned or otherwise verified (e.g., as a print out, on a display of the recipient user device 104, sent electronically, or the like by the event processing system 105 and/or by an employee of an enterprise organization that maintains the event processing system 105). Additionally or alternatively the recipient user device 104 may receive a user input that causes the recipient user device 104 to otherwise communicate the authority token to the event processing system 105.

At step 224, the recipient user device 104 may establish a connection with the event processing system 105. For example, the recipient user device 104 may establish a third wireless data connection with the event processing system 105 to link the recipient user device 104 to the event processing system 105 (e.g., in preparation for sending a task performance request and/or otherwise communicating the authority token). In some instances, the recipient user device 104 may identify whether or not a connection is already established with the event processing system 105. If a connection is already established with the event processing system 105, the recipient user device 104 might not re-establish the connection. If a connection is not yet established with the event processing system 105, the recipient user device 104 may establish the third wireless data connection as described herein.

At step 225, the recipient user device 104 may send a performance request to the event processing system 105 requesting that the task be performed. In some instances, the recipient user device 104 may send, along with the performance request, information about the task to be performed, the authority token, and/or the biometric data. In some instances, the recipient user device 104 may send the performance request to the event processing system 105 while the third wireless data connection is established.

At step 226, the event processing system 105 may receive the performance request sent at step 225. For example, the event processing system 105 may receive the performance request while the third wireless data connection is established. In some instances, in communicating and receiving the performance request at steps 225 and 226, the event processing system 105 may scan or otherwise capture a matrix barcode from the recipient user device 104 (e.g., displayed at the recipient user device 104).

At step 227, the event processing system 105 may validate the authority token. For example, the event processing system 105 may identify whether or not the authority token may be correctly decrypted by the event processing system 105 based on the encryption techniques applied at the authority coordination platform 102. For example, the event processing system 105 may share one or more public, private, or public-private key pairs with the authority coordination platform 102, and may apply the key to the authority token for decryption. In some instances, if the event processing system 105 successfully decrypts the authority token, the event processing system 105 may determine that the authority token is valid. In other instances, the event processing system 105 may request or otherwise access additional verification information for the authority token, which may in some instances be stored at the authority coordination platform 102 (e.g., the token validation information stored at step 217). For example, the event processing system 105 may communicate with the authority coordination platform 102 to request validation of the authority token (e.g., by comparing the authority token to the token validation information). In this example, the authority token may be validated by the authority coordination platform 102, and the authority coordination platform 102 may send an authority validation message to the event processing system 105 indicating that the authority token is valid. In validating the authority token, the event processing system 105 may determine that the second individual has POA to perform a specific task (e.g., the task). If the event processing system 105 determines that the authority token is valid the event processing system 105 may proceed to step 228. If the event processing system 105 determines that the authority token is not valid, the event processing system 105 may proceed to step 229.

Figure 2F:
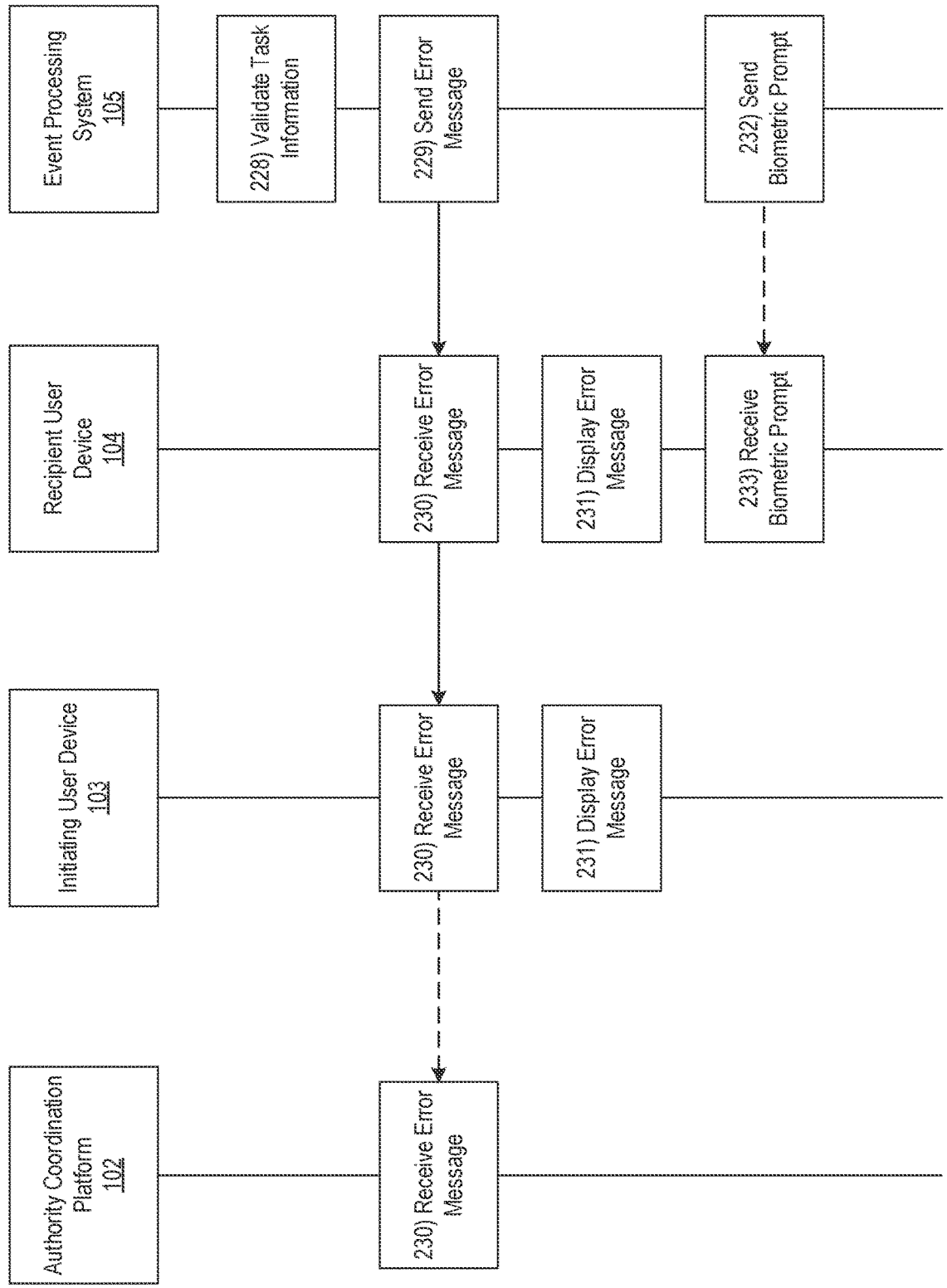

Referring to FIG. 2F, at step 228, the event processing system 105 may validate the information about the task to be performed. For example, the event processing system 105 may validate whether or not the second individual (who has been granted POA) has POA to perform the specific task that he or she is requesting (e.g., although the second individual may have POA to close the safety deposit box, he or she might not have POA to turn off the power or other utility service). In some instances, the event processing system 105 may validate this task information by comparing the information about the task to be performed to task information included in the decrypted authority token. If the information matches, the event processing system 105 may determine that the task should be performed, and may proceed to step 233. If the information does not match the event processing system 105 may determine that the task should not be performed, and may proceed to step 229.

In some instances, the event processing system 105 may validate the information about the task to be performed by communicating with the authority coordination platform 102 to request validation (e.g., by comparing the information to task information previously received/stored at the authority coordination platform 102). In these instances, the information about the task to be performed may be validated by the authority coordination platform 102. In some instances, the authority coordination platform 102 may receive the information about the task to be performed along with the authority token, validate both the task and the authority token, and send a single authority validation message to the event processing system 105 indicating whether or not validation was successful.

At step 229, the event processing system 105 may generate and send an error message to the recipient user device 104, the initiating user device 103, and/or the authority coordination platform 102 indicating that the task was not executed or otherwise performed by the event processing system 105. At step 230, the authority coordination platform 102, initiating user device 103, and/or recipient user device 104 may receive the error message sent from the event processing system 105.

At step 231, the initiating user device 103 and/or the recipient user device 104 may display the error message received at step 230. For example, in displaying the error message, the initiating user device 103 may display a graphical user interface similar to graphical user interface 605, which is shown in FIG. 6. For example, the initiating user device 103 may display a graphical user interface indicating that the task was unable to be completed, and requesting an action to be taken with regard to the POA. In some instances, next steps performed after display of the error message may depend on a user input received at the initiating user device 103 (e.g., select a new POA recipient, retry with the same POA recipient, or the like).

At step 232, the event processing system 105 may generate and send a biometric prompt to the recipient user device 104. In some instances, the event processing system 105 may send the biometric prompt to the recipient user device 104 while the fourth wireless data connection is established.

At step 233, the recipient user device 104 may receive the biometric prompt sent at step 232. In some instances, the recipient user device 104 may receive the biometric prompt sent at step 232 while the third wireless data connection is established.

Figure 2G:
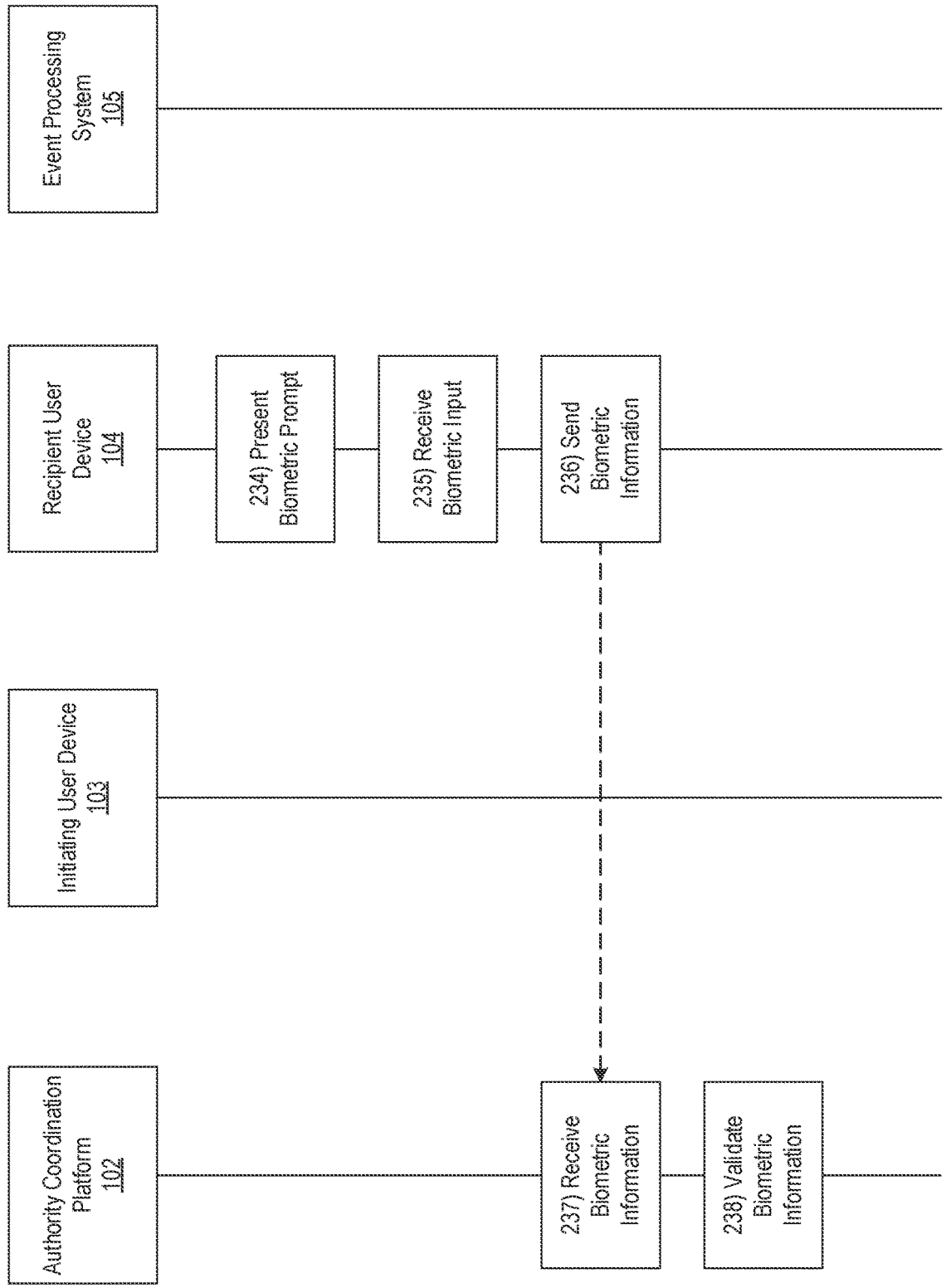

Referring to FIG. 2G, at step 234, the recipient user device 104 may present the biometric prompt received at step 233. For example, the recipient user device 104 may display a graphical user interface similar to graphical user interface 705, which is shown in FIG. 7, that allows the second individual to provide biometric information such as fingerprint data, facial data, retinal data (e.g., for purposes of verifying the identity of the second individual).

At step 235, the recipient user device 104 may receive a biometric input at the biometric prompt presented at step 234. In some instances, actions performed at step 235 may be similar to those described above at step 220. For example, the recipient user device 104 may capture a second biometric input at step 235 to compare with the biometric input collected at step 220.

At step 236, the recipient user device 104 may send biometric information, based on the biometric input received at step 235, to the authority coordination platform 102. In some instances, the recipient user device 104 may send the biometric information to the authority coordination platform 102 while the second wireless data connection is established.

At step 237, the authority coordination platform 102 may receive the biometric information sent at step 236. For example, the authority coordination platform 102 may receive the biometric information via the communication interface and while the second wireless data connection is established.

At step 238, the authority coordination platform 102 may validate the biometric information received at step 237 with the biometric information received and stored at step 222. In doing so, the authority coordination platform 102 may validate that the individual providing the authority token to the event processing system 105 is the second individual (e.g., the true user of the recipient user device 104 and not another individual who has come into possession of the recipient user device 104). If the authority coordination platform 102 determines that the biometric information does not match, an error message may be sent and displayed (e.g., as described above with regard to steps 229-231). If the authority coordination platform 102 determines that the biometric information does match, the authority coordination platform 102 may proceed to step 239.

Figure 2H:
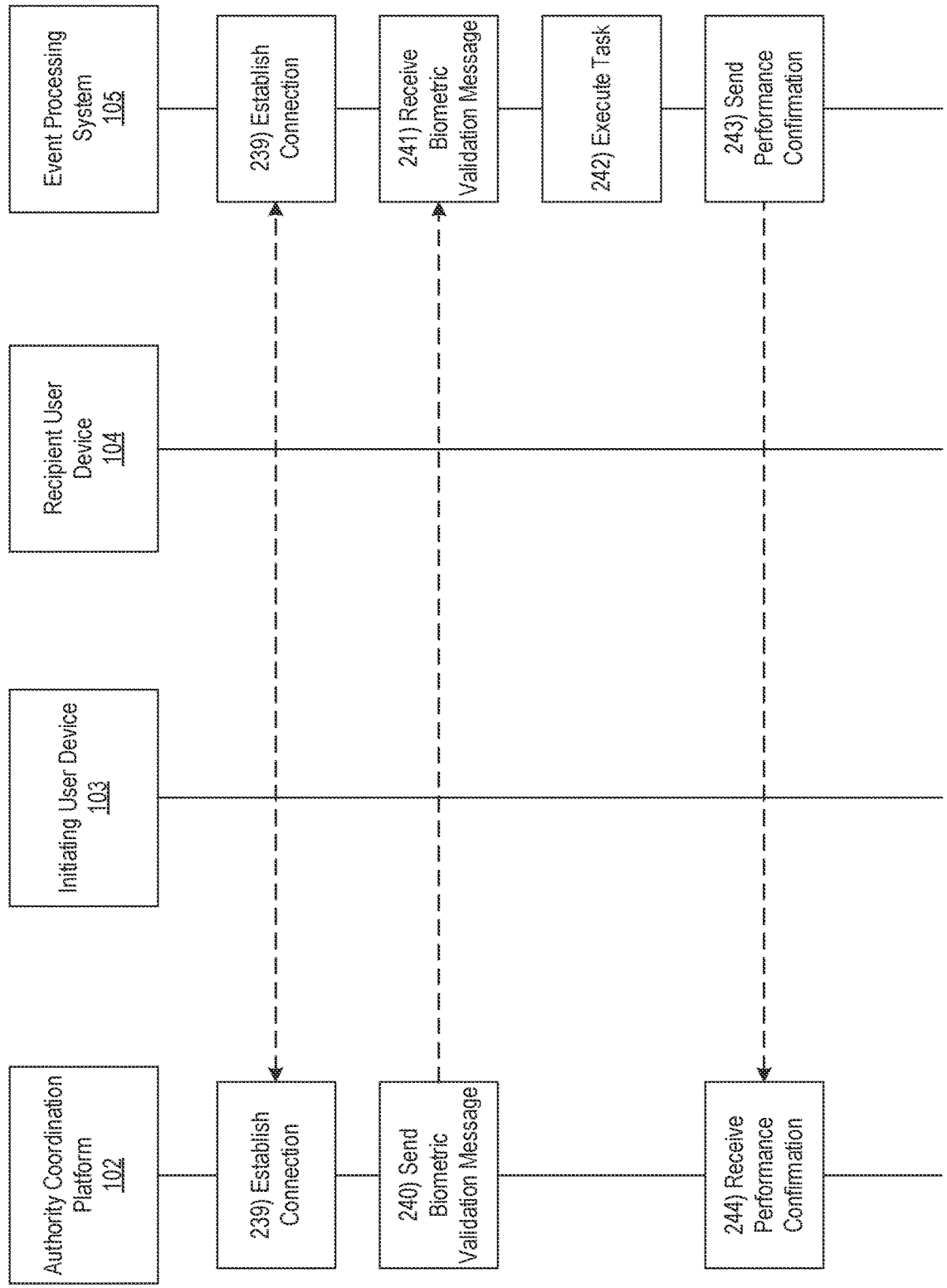

Referring to FIG. 2H, at step 239, the authority coordination platform 102 may establish a connection with event processing system 105. For example, the authority coordination platform 102 may establish a fourth wireless data connection to link the authority coordination platform 102 to the event processing system 105. In some instances, the authority coordination platform 102 may determine whether or not a connection is already established with the event processing system 105. If a connection is already established with the event processing system 105, the authority coordination platform 102 might not re-establish the connection. If a connection is not yet established, the authority coordination platform 102 may establish the fourth wireless data connection as described herein.

At step 240, the authority coordination platform 102 may send a biometric validation message to the event processing system 105 indicating that the biometric information has been validated. For example, the authority coordination platform 102 may send the biometric validation message to the event processing system 105 via the communication interface and while the fourth wireless data connection is established. In some instances, the authority coordination platform 102 may send the biometric validation message to the event processing system 105 based on or in response to determining that there is a match between the biometric data at step 238.

At step 241, the event processing system 105 may receive the biometric validation message sent at step 240. In some instances, the event processing system 105 may receive the biometric validation message while the fourth wireless data connection is established.

At step 242, the event processing system 105 may execute the task requested at step 225 (e.g., by the performance request). For example, the event processing system 105 may perform a transaction, take action with regard to a safety deposit box (e.g., open, close, transfer, or the like), take action with regard to a utility service (e.g., open, close, transfer, or the like), or the like. In some instances, the event processing system 105 may execute the task based on or in response to one or more of the authority validation message or the biometric validation message. For example, one or more of the authority validation message or the biometric validation message may cause the event processing system 105 to perform the task.

At step 243, the event processing system 105 may send a first performance confirmation message to the authority coordination platform 102. For example, the event processing system 105 may send a message indicating that the task has been successfully completed. In some instances, the event processing system 105 may send the first performance confirmation message to the authority coordination platform 102 while the fourth wireless data connection is established. In some instances, in sending the first performance confirmation message, the event processing system 105 may send a receipt, or other confirmation indicating that the task was successfully completed.

At step 244, the authority coordination platform 102 may receive the first performance confirmation message sent at step 243. For example, the authority coordination platform 102 may receive the first performance confirmation message via the communication interface 113 and while the fourth wireless data connection was established.

Figure 2I:
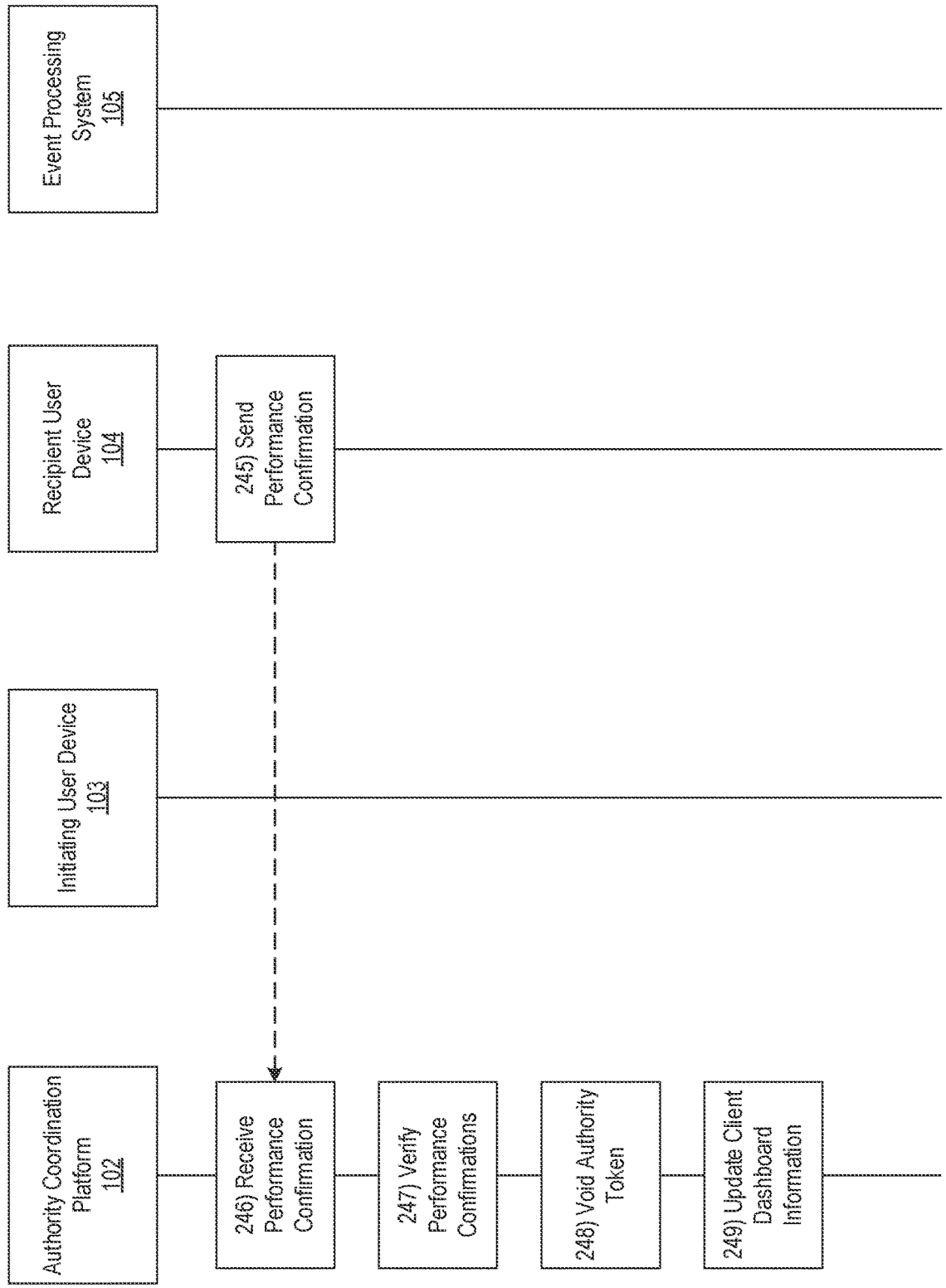

Referring to FIG. 2I, at step 245, the recipient user device 104 may send a second performance confirmation message (e.g., indicating that the second user performed the task) to the authority coordination platform. In some instances, the recipient user device 104 may send the second performance confirmation message to the authority coordination platform 102 while the second wireless data connection is established. In some instances, in sending the second performance confirmation message, the recipient user device 104 may send a confirmation email, receipt, or the like received from the event processing system 105 indicating that the task was successfully performed.

At step 246, the authority coordination platform 102 may receive the second performance confirmation message sent at step 245. For example, the authority coordination platform 102 may receive the second performance confirmation message via the communication interface and while the second wireless data connection is established.

At step 247, the authority coordination platform 102 may verify that a performance confirmation message was received from both the recipient user device 104 and the event processing system 105. If performance confirmation messages were not received from both devices, the authority coordination platform 102 may perform additional actions to verify whether the task was performed (e.g., send a request to the recipient user device 104 and/or the event processing system 105 to verify whether or not the task was performed, or the like). If performance confirmation messages were received from both devices, the authority coordination platform 102 may proceed to step 248.

At step 248, the authority coordination platform 102 may void the authority token. For example, the authority coordination platform 102 may revoke the POA allowing the second individual to perform the task on behalf of the first individual, and render the authority token ineffective.

At step 249, the authority coordination platform 102 may update the client dashboard information generated at step 209. For example, the authority coordination platform 102 may update the client dashboard information to reflect that the task has been completed. In some instances, updating the client dashboard information may cause the initiating user device 103 to display a client dashboard interface indicating that the task has been completed (e.g., as described below at step 252).

Figure 2J:
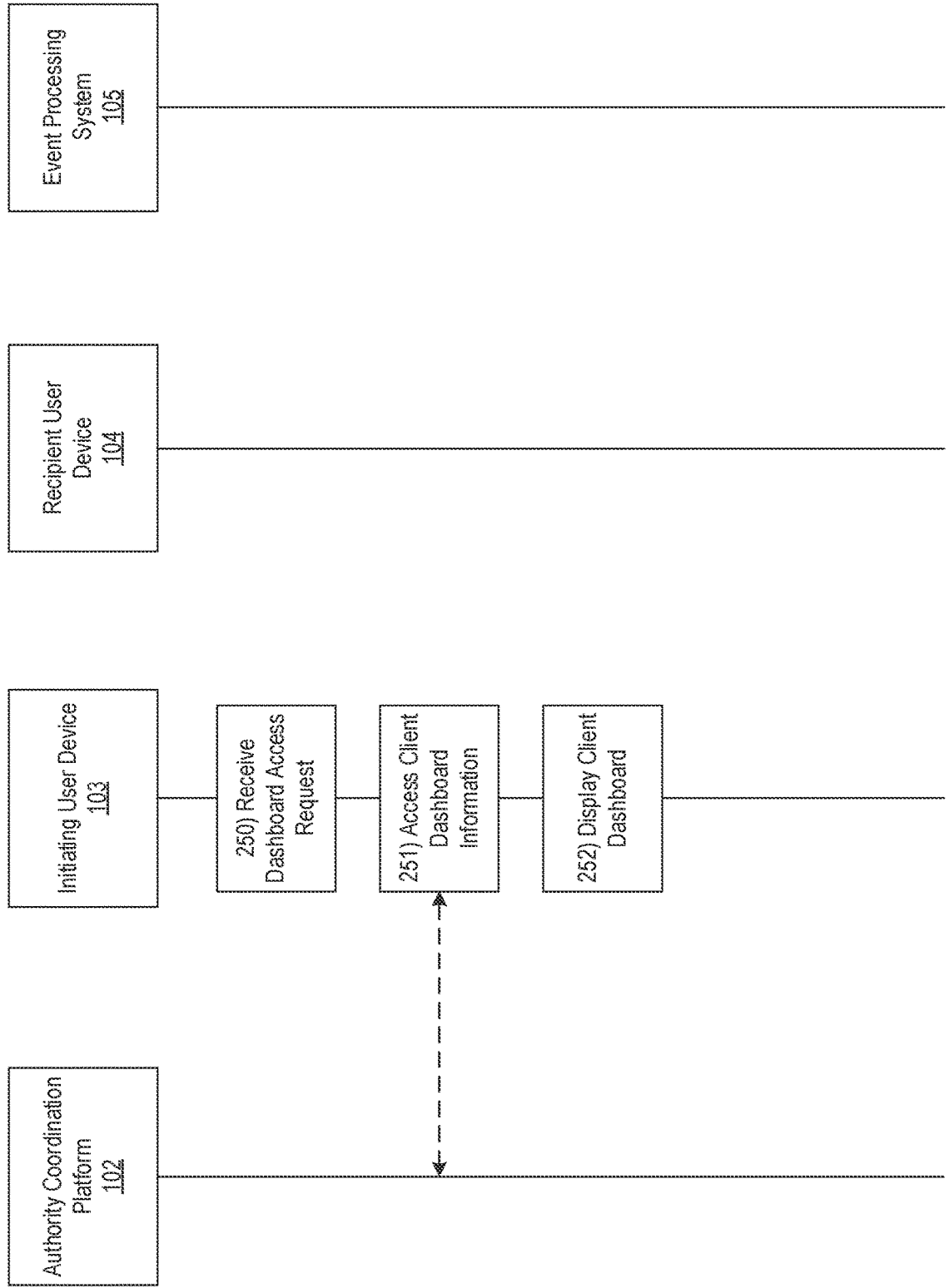

Referring to FIG. 2J, at step 250, the initiating user device 103 may receive a client dashboard access request. For example, the initiating user device 103 may receive a request from the first individual to check the status of the task.

At step 251, the initiating user device 103 may access the client dashboard information (e.g., which was updated at step 249). In some instances, the initiating user device 103 may access the client dashboard information while the first wireless data connection is established.

Figure 8:
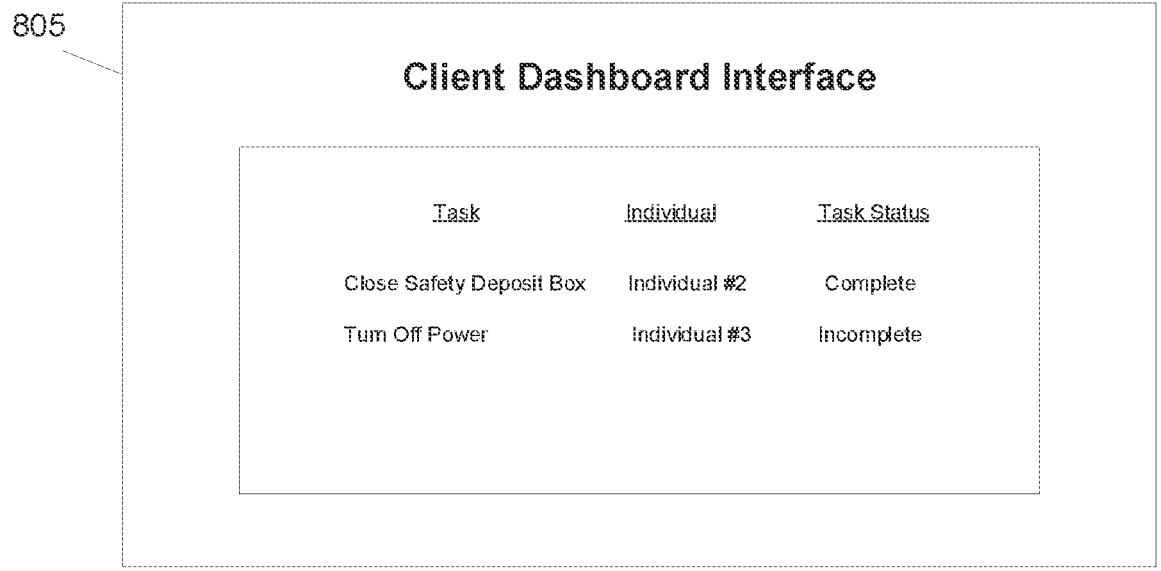

At step 252, the initiating user device 103 may display a client dashboard interface using the client dashboard information. For example, in some instances, the initiating user device 103 may display a graphical user interface similar to graphical user interface 805, which is shown in FIG. 8. For example, the initiating user device 103 may show that the task of closing the safety deposit box has been completed by the second individual.

Figure 3:
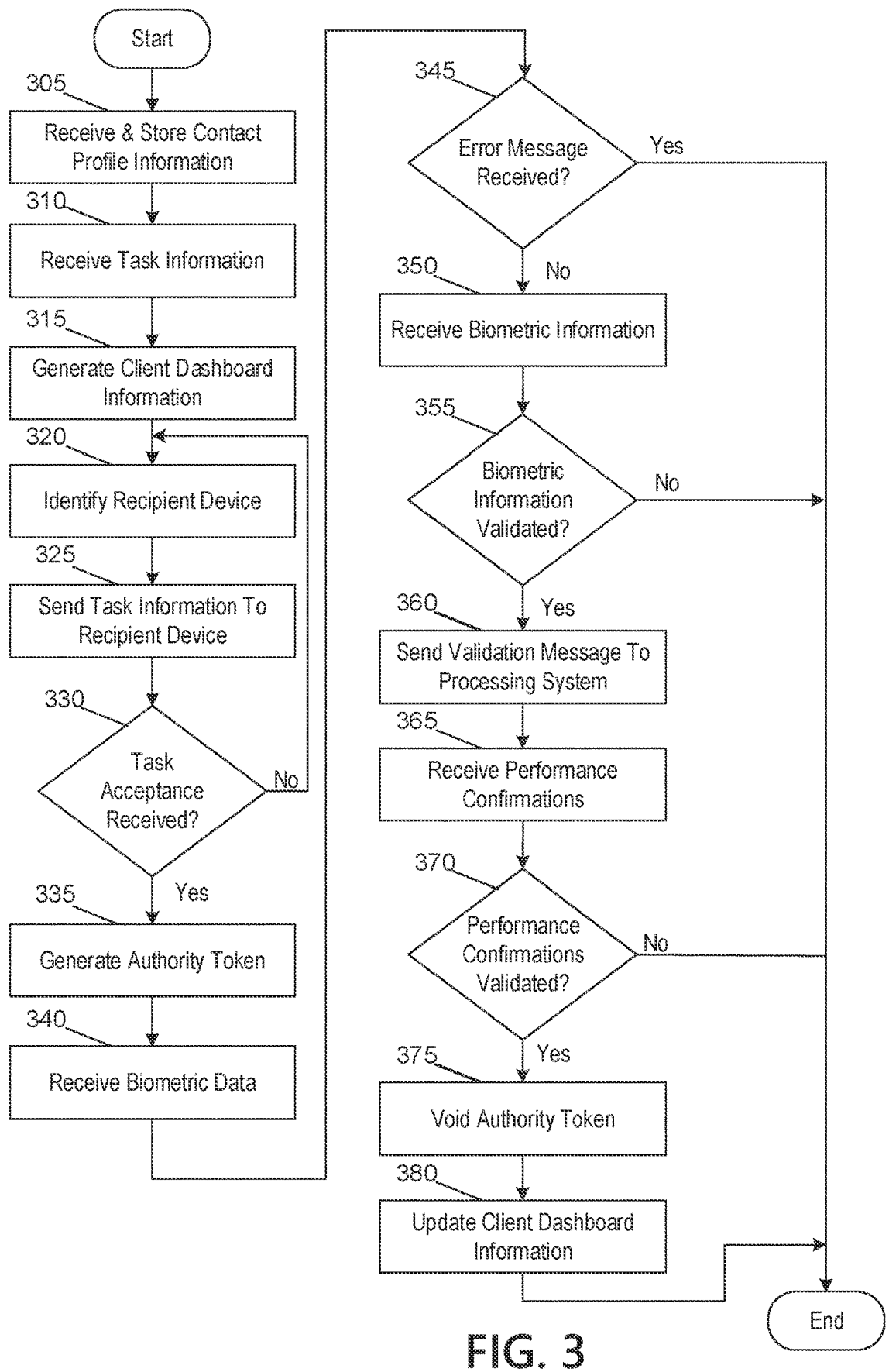
FIG. 3 depicts an illustrative method for implementing techniques for generation and validation of a power of attorney token in accordance with one or more example embodiments.

FIG. 3 depicts an illustrative method for implementing generation and validation of a power of attorney token in accordance with one or more example embodiments. Referring to FIG. 3, at step 305, a computing platform having at least one processor, a communication interface, and memory may receive and store contact profile information for a plurality of POA recipients. At step 310, the computing platform may receive task information indicating a task to be performed for an individual by one of the plurality of POA recipients. At step 315, the computing platform may generate client dashboard information indicating the task and a task status. At step 320, the computing platform may use the contact profile information to identify a recipient computing device corresponding to one of the POA recipients. At step 325, the computing platform may send the task information to the recipient device. At step 330, the computing platform may identify whether or not the task was accepted. If the task was not accepted, the computing platform may return to step 320. If the task was accepted, the computing platform may proceed to step 335.

At step 335, the computing platform may generate an authority token granting POA to the user of the recipient device to perform the task. At step 340, the computing platform may receive biometric data from the recipient device identifying a user of the recipient device. At step 345, the computing platform may determine whether an error message was received with regard to attempted performance of the task. If an error message was received, the method may end. If an error message was not received, the computing platform may proceed to step 350.

At step 350, the computing platform may receive additional biometric information. At step 355, the computing platform may validate the additional biometric information. If the biometric information was not validated, the method may end. If the biometric information was validated, the computing platform may proceed to step 360.

At step 360, the computing platform may send a validation message to an event processing system, indicating that the biometric information was validated. At step 365, the computing platform may receive one or more performance confirmation messages. At step 370, the computing platform may validate the performance confirmation messages. If the performance confirmation messages are not validated, the method may end. If the confirmation messages are validated, the computing platform may proceed to step 375.

At step 375, the computing platform may void the authority token. At step 380, the computing platform may updated the client dashboard information to indicate that the task was successfully completed.

In some instances, the systems, event sequence, and/or methods described above might not be limited to granting power of attorney, and may in some instances relate to use cases involving responding to natural disasters, emergencies, and/or other life events that may leave customers and clients unable to access personal documents from their homes or cities. Additionally or alternatively, the systems and methods described above may be used to maintain control and/or otherwise protect sensitive information and/or to increase access to identification information, and/or financial services during emergencies.

For example, in some instances, the systems and methods described above may be used to validate an identity of an individual and provide an emergency identification, credit line, or the like. In these instances, information may be stored in a digital vault (e.g., which may be stored or otherwise maintained at the authority coordination platform 102, and may, in some instances, be used to store authority tokens as described above) that may prompt an individual to identify him/herself with a combination of biometrics, secret questions, and/or a secondary identifier.

In some instances, an emergency electronic vault may be deployed which may store financial information, government identification information, insurance card information, or the like. In some instances, clients may enroll into the emergency vault, which may "use know your customer (KYC) services," or the like to authenticate identity of the client. In some instances, the system may utilize multi-factor authentication to access the vault, and may have established partnerships configured to accept an emergency identifier stored within.

As a particular use case, a hurricane may cause residents to relocate from their hometown. In some instances, these individuals might not have access personal documents, financial documents, or the like. One or more of the systems described herein may allow these affected individuals to have access to a bank-provided emergency identifier, access to a financial credit line, or the like.

Additionally or alternatively, the systems, event sequence, and/or methods described above may relate to storing digital secrets in a vault. For example, methods and systems may be included herein for storing secret information in a digital vault including obtaining, from a user, answers to a number of different questions, and identifying which subsets or combinations of the questions for which correct answer later provided by an entity may enable that entity to gain access to the secret information in the vault. In some instances, the number of questions in each combination may be less than the total number of questions, and in some instances, one subset may have at least two questions. For each subset, a corresponding string of answers may be generated, the string may be hashed, and the resulting hash value may be combined with the digital secret. This may hide the digital secret, which may then be stored in the vault. Methods and systems for registering authentication material include storing a hashed string of answers for each combination, thus generating multiple authenticators. In some instances, similar techniques or methods may be used to encrypt or otherwise store the authority token described above.

In these instances, the vault as described above may be implemented in similar methods as described above with regard to the authority token Additionally or alternatively, the systems, event sequence, and/or methods described above may relate to emergency identification, and/or records access authorization media. For example, a single notice of notification in print form, electronic media form, or the like may provide authorization to treat in accordance with the guidelines set out by a patient and to contact those persons and entities designed by the patient including medications being taken, allergies of the patient, identification of the patient's primary care physician, identification of an emergency contact, a family member or friend, the existence of a living will, prior appointment of power of attorney for the patient and from what entity a copy of the document(s) may be obtained, a signed written consent of the patient (e.g., in a Health Insurance Portability and Accountability Act (HIPAA)-compliant format) authorizing contact, patient health information disclosure, treatment for the patient in accordance with the information provided in the notice, or the like. These systems and methods may also present aid personnel and others with information focused on the search and recovery of an individual who may be missing or lost. In doing so, one or more of these systems may perform similar techniques to those described above with regard to the authority token.

Accordingly, the techniques described above with regard to generation and validation of the authority token may be applied to a variety of additional scenarios without departing from the scope of the disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, from a first individual, user input indicating a task to be performed and requesting that a power of attorney be granted to a second individual, wherein the task is required to be performed in person by one of: the first individual or an individual who has been granted power of attorney by the first individual;
      generate an authority token granting the second individual the power of attorney for the first individual to perform the task;
      send, to a user device corresponding to the second individual, the authority token and task information indicating the task;
      after sending the authority token and the task information indicating the task to the user device corresponding to the second individual, receive, from an event processing system, a validation request comprising the authority token and the task information indicating the task;
      validate the authority token and the task information indicating the task;
      based on successful validation of the authority token and the task information indicating the task, send authority validation information to the event processing system;
      receive confirmation information from the user device corresponding to the second individual indicating that the task has been completed; and
      after receiving confirmation that the task has been performed by the second individual, update client dashboard information to indicate that the task has been completed, wherein updating the client dashboard information to indicate that the task has been completed causes the user device to display a client dashboard indicating that the task has been completed, and wherein the client dashboard includes a status of one or more tasks including the task, wherein each of the one or more tasks are performed by one or more individuals including the second individual.

2. The computing platform of claim 1, wherein the first individual is located in a first state, and wherein the task is to be performed in a second state.

3. The computing platform of claim 1, wherein the task is to be performed at a first enterprise organization, and wherein the authority token is formatted for use exclusively by the first enterprise organization.

4. The computing platform of claim 1, wherein generating the authority token comprises:
   sending, to the user device corresponding to the second individual, a request to input biometric data;
   receiving biometric information corresponding to the second individual; and
   generating, based at least in part on the biometric information, the authority token.

5. The computing platform of claim 4, wherein the memory stores additional computer-readable instructions that, when executed by the at least one processor, further cause the computing platform to:
   send, to the user device corresponding to the second individual, a request to display an indication of the task and prompt for acceptance of the task; and
   receive, from the user device corresponding to the second individual, task acceptance information indicating that the second individual will perform the task, wherein generating the authority token is based on receipt of the task acceptance information.

6. The computing platform of claim 5, wherein the request to input the biometric data is sent along with the request to display the indication of the task and wherein the biometric data is received along with the task acceptance information.

7. The computing platform of claim 4, wherein the request to input the biometric data is sent along with the authority token.

8. The computing platform of claim 4, wherein the memory stores additional computer-readable instructions that, when executed by the at least one processor, further cause the computing platform to:
   receive additional biometric data from the user device corresponding to the second individual;
   identify, by comparing the additional biometric data to the biometric data, a biometric match for the second individual; and
   send, based on identifying the biometric match for the second individual, biometric validation information to the event processing system.

9. The computing platform of claim 8, wherein sending the authority validation information and the biometric validation information to the event processing system causes the event processing system to perform one or more actions corresponding to the task.

10. The computing platform of claim 1, wherein the memory stores additional computer-readable instructions that, when executed by the at least one processor, further cause the computing platform to:
receive, from the user device corresponding to the first individual, contact information for the second individual; and
store the contact information in a user profile corresponding to the second individual.

11. A method comprising:
at a computing platform comprising at least one processor, a communication interface, and memory:
receiving, from a first individual, user input indicating a task to be performed and requesting that a power of attorney be granted to a second individual, wherein the task is required to be performed in person by one of: the first individual or an individual who has been granted power of attorney by the first individual;
generating an authority token granting the second individual the power of attorney for the first individual to perform the task;
sending, to a user device corresponding to the second individual, the authority token and task information indicating the task;
after sending the authority token and the task information indicating the task to the user device corresponding to the second individual, receiving, from an event processing system, a validation request comprising the authority token and the task information indicating the task;
validating the authority token and the task information indicating the task;
based on successful validation of the authority token and the task information indicating the task, sending authority validation information to the event processing system;
receiving confirmation information from the user device corresponding to the second individual indicating that the task has been completed; and
after receiving confirmation that the task has been performed by the second individual, updating client dashboard information to indicate that the task has been completed, wherein updating the client dashboard information to indicate that the task has been completed causes the user device to display a client dashboard indicating that the task has been completed, and wherein the client dashboard includes a status of one or more tasks including the task, wherein each of the one or more tasks are performed by one or more individuals including the second individual.

12. The method of claim 11, wherein the first individual is located in a first state, and wherein the task is to be performed in a second state.

13. The method of claim 11, wherein the task is to be performed at a first enterprise organization, and wherein the authority token is formatted for use exclusively by the first enterprise organization.

14. The method of claim 11, wherein generating the authority token comprises:
sending, to the user device corresponding to the second individual, a request to input biometric data;
receiving biometric information corresponding to the second individual; and
generating, based at least in part on the biometric information, the authority token.

15. The method of claim 14, wherein the memory stores additional computer-readable instructions that, when executed by the at least one processor, further cause the computing platform to:
send, to the user device corresponding to the second individual, a request to display an indication of the task and prompt for acceptance of the task; and
receive, from the user device corresponding to the second individual, task acceptance information indicating that the second individual will perform the task, wherein generating the authority token is based on receipt of the task acceptance information.

16. The method of claim 15, wherein the request to input the biometric data is sent along with the request to display the indication of the task and wherein the biometric data is received along with the task acceptance information.

17. The method of claim 14, wherein the request to input the biometric data is sent along with the authority token.

18. The method of claim 14, wherein the memory stores additional computer-readable instructions that, when executed by the at least one processor, further cause the computing platform to:
receive additional biometric data from the user device corresponding to the second individual;
identify, by comparing the additional biometric data to the biometric data, a biometric match for the second individual; and
send, based on identifying the biometric match for the second individual, biometric validation information to the event processing system.

19. One or more non-transitory computer-readable media storing instructions that, when executed by a computing platform comprising at least one processor, a communication interface, and memory, cause the computing platform to:
receive, from a first individual, user input indicating a task to be performed and requesting that a power of attorney be granted to a second individual, wherein the task is required to be performed in person by one of: the first individual or an individual who has been granted power of attorney by the first individual;
generate an authority token granting the second individual the power of attorney for the first individual to perform the task;
send, to a user device corresponding to the second individual, the authority token and task information indicating the task;
after sending the authority token and the task information indicating the task to the user device corresponding to the second individual, receive, from an event processing system, a validation request comprising the authority token and the task information indicating the task;
validate the authority token and the task information indicating the task;
based on successful validation of the authority token and the task information indicating the task, send authority validation information to the event processing system;
receive confirmation information from the user device corresponding to the second individual indicating that the task has been completed; and
after receiving confirmation that the task has been performed by the second individual, update client dashboard information to indicate that the task has been completed, wherein updating the client dashboard information to indicate that the task has been completed causes the user device to display a client dashboard indicating that the task has been completed, and wherein the client dashboard includes a status of one or more tasks including the task, wherein each of the one or more tasks are performed by one or more individuals including the second individual.

* * * * *